May 9, 1950

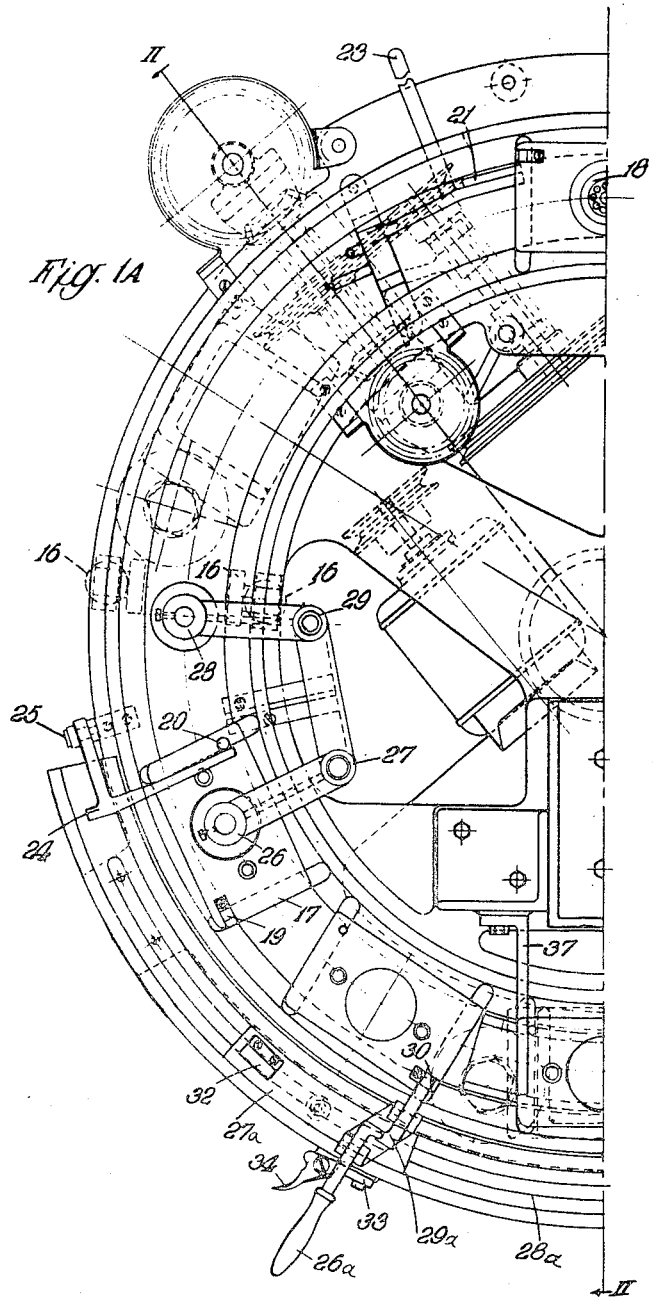

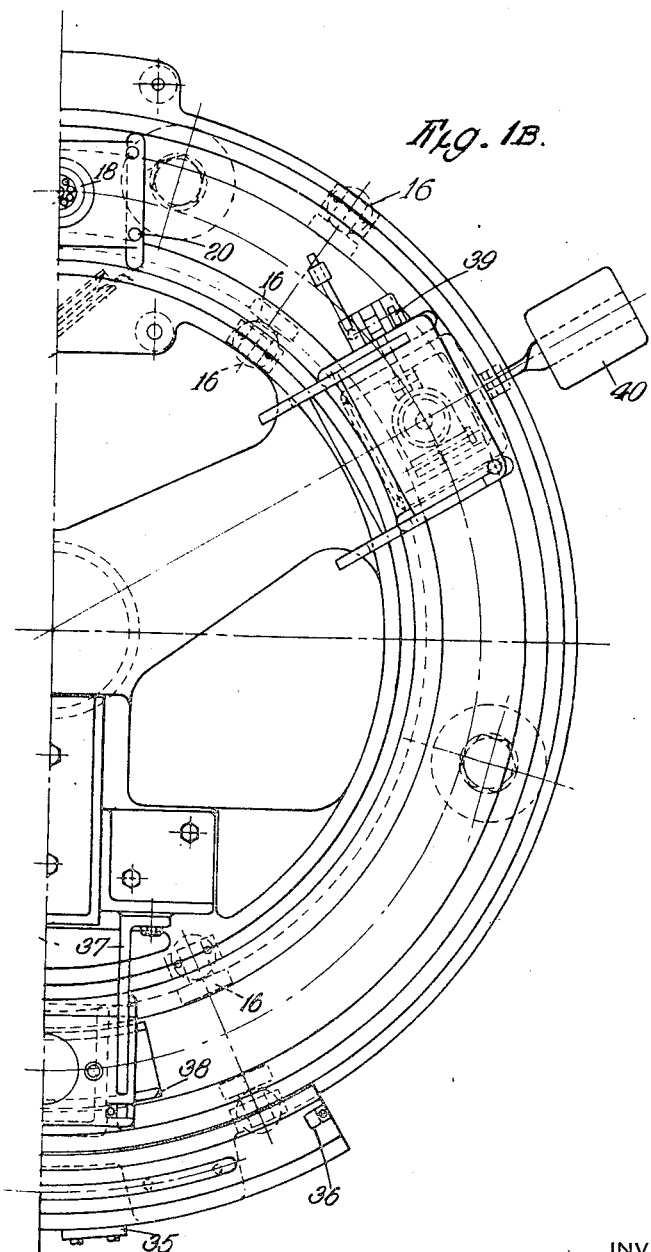

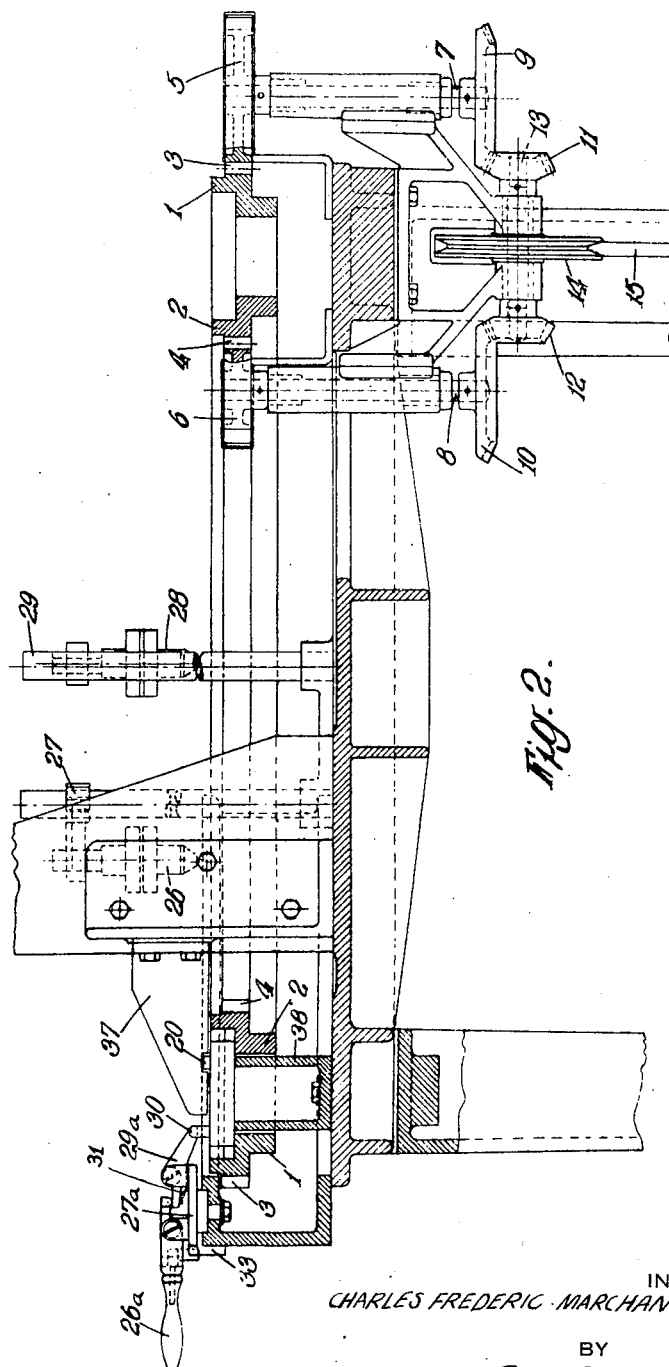

C. F. M. HAYES 2,507,441

GLASS MOLDING MACHINE

Filed Nov. 9, 1944

INVENTOR
CHARLES FREDERIC MARCHANT HAYES

BY
C. F. Wenderoth
ATTORNEY

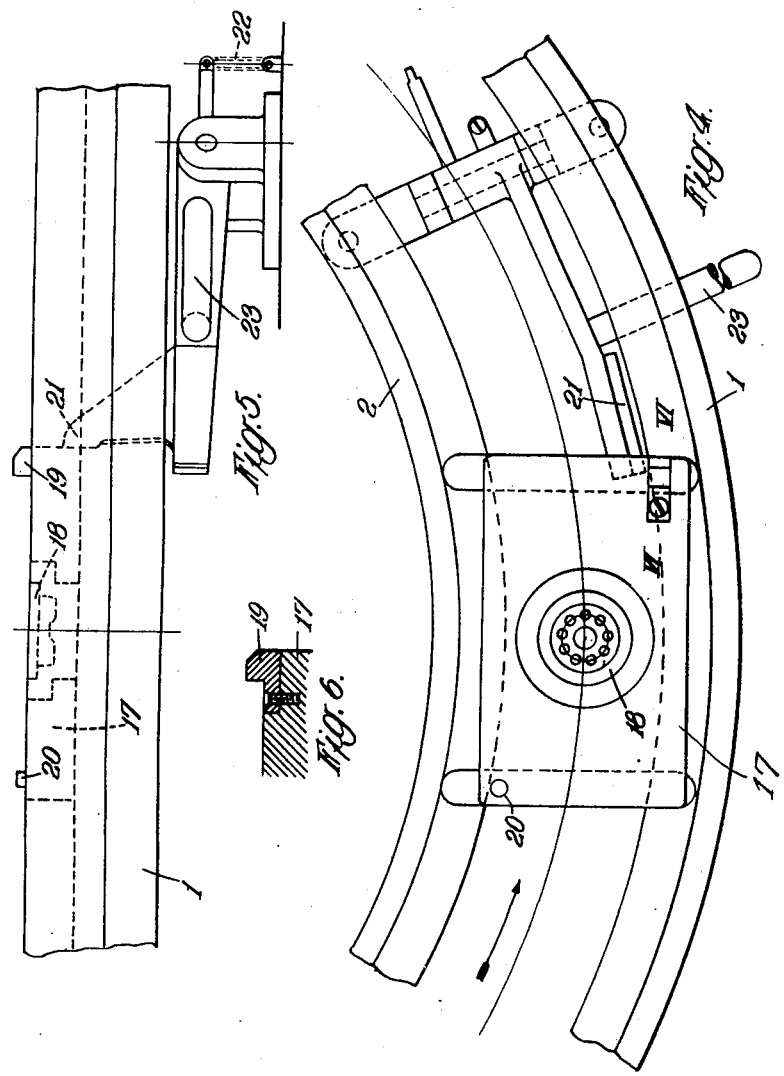

Patented May 9, 1950

2,507,441

UNITED STATES PATENT OFFICE 2,507,441

GLASS MOLDING MACHINE

Charles Frederic Marchant Hayes, Wandsworth, England, assignor to The Mullard Radio Valve Company Limited, London, England, a British company Application November 9, 1944, Serial No. 562,652
In Great Britain March 2, 1943

Section 1, Public Law 690, August 8, 1946
Patent expires March 2, 1963

12 Claims. (Cl. 49—37)

In glass moulding machines it is necessary for the interval between the introduction of the molten glass into the mould or die, and the application of moulding pressure, to be kept as short as possible. Also, if metal components, such as pins serving as lead-in and supports in the bases of electric discharge tubes, are to be moulded in the glass they must be introduced into the die and pre-heated before the molten glass is introduced. It is then desirable for the interval between pre-heating of pins and introduction of molten glass to be as short as possible. A convenient form of glass moulding machine is that in which the dies are caused to traverse a closed path along which are spaced the individual working stations at which the different operations are performed.

The object of the present invention is to enable the dies to travel between successive working stations at the speed appropriate to the operations to be performed.

According to the present invention the working stations are respectively carried on carriage-like members which are arranged along a continuous track and the dies are freely carried by the track and are conveyed by movement of the track in spaced-apart station, means being provided at the said working stations for engaging a die and causing relative movement between that die and the moving track while permitting continuing movement of the track for the conveyance of non-engaged carriage-supported dies. Advantageously the track is circular and is driven at a constant speed, the dies which are respectively secured to the said carriage-like members freely carried by the track participating in the movement except when engaged by other means associated with the machine and adapted to cause relative movement between the said carriage-like members and therethrough the die or dies thus engaged and the track. It will be apparent that the engaging means may consist of stops arresting the dies at a selected station; alternatively the engaging means may be moved automatically or manually to impart to the said carriage-like members and the associated dies a rate of movement between stations greater than or smaller than the constant speed of the track.

Advantageously the track is constructed in the form of an inner ring member and an outer ring member, the two rings being separate and spaced from one another. Preferably both rings are driven each at the same angular speed, but if desired one only may be driven, in which case movement is imparted to the other ring by way of the dies which are carried by the two rings.

In order that the invention may be more readily understood, reference will now be made to the accompanying drawings which show, by way of example, an embodiment in which the machine is designed for moulding glass bases for electric discharge tubes with lead-in and support pins embedded in the glass, and the track consists of separate inner and outer rails, both positively driven. In the drawings:

Figures 1A and 1B together constitute a general plan view of the machine.

Fig. 2 is a section substantially along the line II—II of Fig. 1, but on a larger scale.

Fig. 4 is a fragmentary plan view showing the pin inserting station on a larger scale than in Fig. 1.

Fig. 5 is a fragmentary elevation corresponding to Fig. 4.

Fig. 6 is a detail section along the live VI—VI of Fig. 4.

Figure 3:
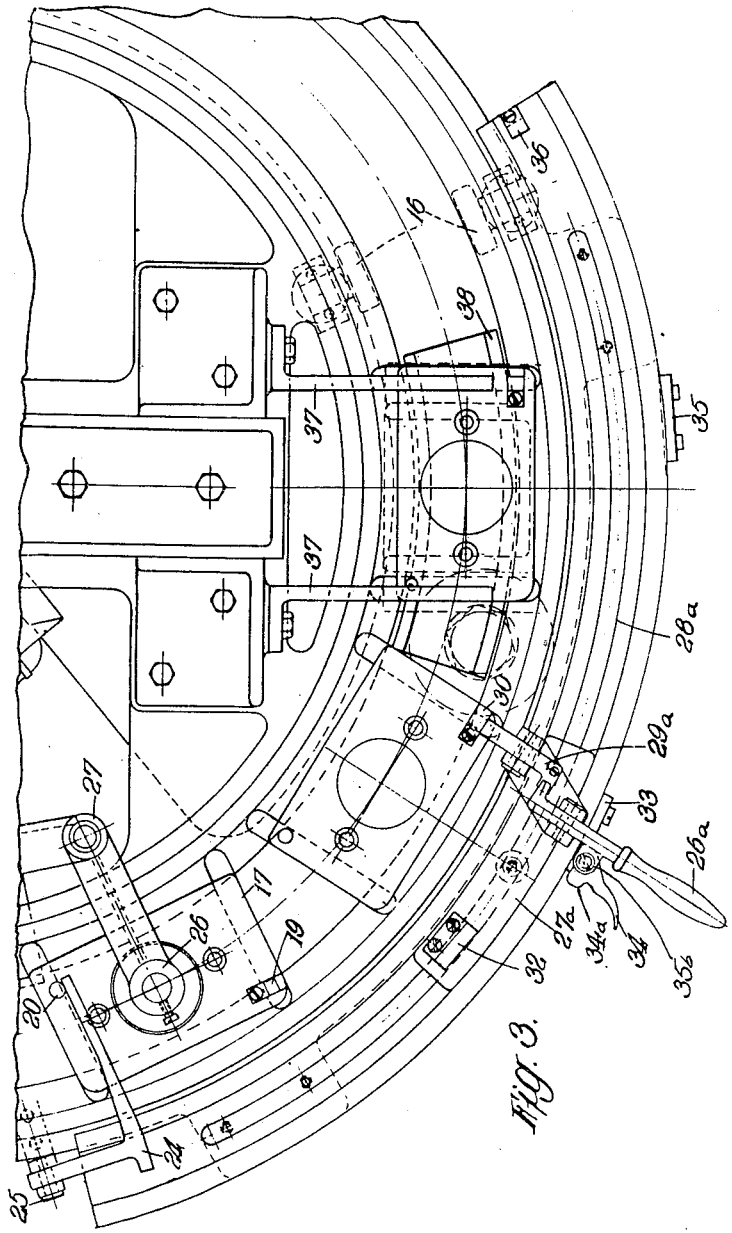
Fig. 3 is a fragmentary plan view showing the glass moulding station on a larger scale than in Fig. 1.

The track on which the dies are supported and transported consists of two concentric annular track members, namely an outer track member 1 and an inner track member 2. As best seen from Fig. 2, these track members are so shaped as to define an annular channel within which the dies are supported. In the construction shown, the outer surface of the outer track member 1 is provided with gear teeth 3, and the inner surface of the inner track member 2 is provided with gear teeth 4. These teeth 3, 4, mesh with pinion wheels 5, 6 respectively which are secured on shafts 7, 8, the other ends of which carry bevel gears 9, 10 meshing with bevel gears 11, 12 secured on a shaft 13 carrying a pulley 14 to which the drive is transmitted by way of a driving belt 15 from a suitable source such as an electric motor mounted on the base of the machine. The gear trains 11, 9, 5, 3 and 12, 10, 6, 4 respectively are so chosen that the two track members 1, 2 are caused to travel at the same angular speed about the centre of the track system. To give free rotation of the tracks, they are supported and centred by roller bearings 16.

The dies proper, one of which is shown at 18 in Figs. 4 and 5, are each mounted in a carriage 17 which is designed so as to fit in the track channel and to be supported by the inner and outer track members 1, 2. Each carriage 17 is provided with an upstanding projection 19 near its leading edge and an upstanding pin 20 near its rear edge. Preferably the projection 19 is carried by a replaceable block secured in a recess in the carriage 17 as best shown in Fig. 6.

Assume a carriage 17 to be arrested at the station at the top of Fig. 1A where it is held against movement on the tracks 1, 2 by the stop 21. This stop is normally held in the operative position by a spring 22, but can be released by the operator at this station by means of the release handle 23. At this station (the pin station), the lead-in and support pins which are to be moulded in the glass base are positioned in the die which has holes to receive and locate the pins. The pins may be inserted by hand or by any suitable mechanism. After the die 18 has been loaded with pins, the stop 21 is retracted and, due to the movement of the track rails, the die carriage 17 is conveyed in the counter-clockwise direction in Fig. 1A to the next station which is the die and pin preheating station. This station occupies the bottom left of Fig. 1A and is shown on a larger scale in Fig. 3.

On reaching the die and pin preheating station, the carriage 17 is arrested by a stop arm 24 which extends across the track above the carriage and has a dependent end which normally lies in the path of the pin 20 upstanding at the rear end of the carriage 17. The arm 24 is pivotally mounted on a shaft 25 so that it can be rocked to release the pin 20 to permit continued movement of the carriage 17. When arrested by the arm 24, the carriage 17 is so positioned that the die 18 thereon is located beneath a pre-heating gas burner 26 carried on a bracket 27. A further pre-heating gas burner 28 carried by a support 29 is also provided so that if a second carriage 17 arrives before the carriage 17 at the stop 24 is released, the die and pins in this carriage are likewise pre-heated. In this way it is ensured that both die and pins are adequately pre-heated to receive the molten glass. The movement of the carriage 17 through the glass receiving and moulding station is controlled by the operator at this station by the mechanism which will now be described.

Slidable in an arcuate guide 28a, concentric with the track 1, 2, is a carriage 27a on which is mounted an operator's handle 26a. This handle 26a is pivoted on the carriage 27a and its forward end engages the tail of a further lever 29a which is likewise pivoted on the carriage 27a. The other end of the lever 29a extends over the track and is formed as a fork 30 adapted to embrace the upstanding projection 19 at the leading edge of the die carriage. The lever 29a is normally held in the projection-engaging position by a spring 31 but can be released by the operator by manipulation of the handle 26a. The carriage 27a also carries at its left-hand end (Fig. 1A) a trip member 32 which, when the carriage 27a is moved to the extreme left-hand end of the guide 28a, engages the stop arm 24 and lifts it to release the pin 20. However, the forked end 30 of the lever 29a on the carriage 27a has already engaged the projection 19 on the die carriage 17, so that the latter is coupled with the operator-controlled carriage 27a. The operator then moves the handle 26a into the position in which it is shown in Figs. 1A and 3. Here it is arrested by a fixed stop 33 on the guide 28a. In this position the die in the carriage 17 is immediately below the molten glass delivery so that a charge of molten glass is received by the die. In the absence of the die, the glass drops straight through the gap between the two track members into a water bath and can be collected and re-melted in the conventional way. After the die has received the charge of molten glass, the operator actuates a release trip 34 (see Fig. 3) whereby the abutment 34a on the handle 26a which encountered the stop 33, is rotated about the shaft 35b to be released from engagement with said stop and the operator can move the carriage 27a into the moulding position, where the abutment 34a on the handle 26a is arrested by a fixed stop 35. In the drawing the moulding position is indicated by the two side guards 37. It is assumed that a plunger forming the complementary part of the mould is lowered on to the die 18 to exert the moulding pressure. The pressure plunger may be manually or mechanically actuated. In order that the application of the moulding pressure should not interfere with the movement of the rails 1, 2, the carriage 17 on being moved into the moulding position runs up on to a ramp 38 which supports it and prevents the moulding pressure from being transmitted to the rails 1 and 2. After the moulding operation, the operator releases the trip 34 and moves the handle 26a into its extreme right-hand end position where a fixed abutment 36 encounters the lever 29a and rocks it to release the carriage 17 which is then carried by the moving rails 1, 2 to the next station where the moulded base is ejected. While coupled with the handle 26a and thus under the control of the operator, the die carrier 17 can be constrained to move at any desired speed from one position to the next, so that the movement may be slower than or more rapid than the movement of the tracks 1, 2.

At the ejection station, the carriage 17 is arrested by a stop 39, similar to the stop 21 (Figs. 4 and 5). This stop 39 is normally in its operative position, but when the operator actuates a foot pedal 40 serving to operate the ejector mechanism whereby, in known manner, the moulded base is ejected, the stop 39 is retracted to allow the carriage 17 carrying the empty die to pass to the pin filling station where the cycle of operation recommences. The machine, as illustrated, requires three operators, one at each station, and can conveniently be operated with four dies and die carriers.

I claim:

1. Glass moulding apparatus, comprising means constituting a circular double-track having inner and outer track members providing a supporting channel portion therebetween, gearing means for moving said track, at least one carriage-like member being shaped to slip-drive fit in said channel so as to be moved by the members of the said double-track as said track member is moved by said gearing means, a die member mounted on said carriage member for movement therewith, control means mounted in spaced-apart relation adjacent to said track, said carriage-like member being provided with an upstanding projection portion near its leading edge thereof and an upstanding pin portion near its rear edge thereof, said control means including independently controlled elements movable into and out of the path of the said upstanding portions for controlling the movement of the said carriage-like member and thereby its associated die member around the said track.

2. Glass moulding apparatus, comprising means constituting a circular track formed by separate inner and outer track members providing a supporting channel therebetween, gearing means for moving the said track members, at last one carriage-like member shaped to slip-drive fit in said channel and to be moved by the said track members, a die member mounted on said carriage-like member, manually selective control means operatively disposed in spaced-apart relation adjacent said track, said carriage-like member being provided with an upstanding projection near its leading edge thereof and an upstanding pin near its rear edge thereof, said control means including elements selectively movable out of the path of the said upstanding projection and said upstanding pin.

3. Glass moulding apparatus, comprising means constituting a circular double-track formed by an inner member and an outer member so as to provide a channel therebetween, gearing means for moving at least one of the said track members, at least two carriage-like members shaped to slip-drive fit one after the other in said channel, die means respectively mounted on said carriage members for movement with the said carriage-like members, and control means disposed in spaced-apart relation around the said double-track, said carriage-like members each provided with an upstanding projection portion near the leading edge thereof and an upstanding pin portion near the rear edge thereof, said control means including manually actuated stop means movable into and out of the path of said upstanding portions.

4. Glass moulding apparatus, comprising movable support means constituting a circular double-track formed by an inner track member and an outer track member collectively providing a channel-like supporting portion therebetween, at least two similar carriage members each shaped to slip-drive fit in said channel in spaced-apart relation, die members respectively mounted on said carriage members for movement therewith around said track, and control means positioned in spaced-apart relation around the said track in an operative relation to the said track and to the said carriage members, said carriage members each provided with an upstanding projection portion near the leading edge thereof and an upstanding pin portion near the rear edge thereof, and means comprising a manually controlled element for lifting the said carriage members to a position spaced above the said track during the application of moulding pressure to the associated die member and its contents.

5. Glass moulding apparatus, comprising a circular double-track formed by separate inner and outer track members providing a support channel therebetween, gearing means to continuously drive said track members, a plurality of carriage members shaped to slip-drive fit in said channel in spaced-apart relation about said track, a plurality of dies respectively mounted on said carriage members for slip-drive movement therewith around said track, manually selective control elements mounted in spaced-apart relation around said track and normally stationary relative thereto, said carriage-like members each being provided with an upstanding projection portion near its leading edge and an upstanding pin portion near its rear edge, certain of said control elements including automatic and manual actuating portions selectively movable into and out of the path of the said upstanding portions.

6. Glass moulding mechanism, comprising a double circular track provided with a channel recess, at least two carriage members shaped to slide-fit in said channel recess in spaced-apart relation, dies respectively mounted on said carriage members, gearing means for moving the said track and therethrough the said carriage members and the said associated dies, and control means mounted in spaced-apart relation adjacent said track, said carriage members each being provided with an upstanding projection portion near its leading edge thereof and an upstanding pin portion near its rear edge thereof, said control means including certain stop elements for arresting the said carriage members.

7. Glass moulding apparatus, comprising a double circular track provided with a channel recess between the inner and outer portions of said double-track, gearing means to provide a constant drive for said portions of said track, at least two carriage-like members shaped to slip-drive fit in the said channel recess normally in spaced-apart relation about said track, at least two die members respectively securely mounted on said carriage-like members for movement therewith about said circular track, a plurality of sets of control means mounted in spaced-apart relation adjacent said track, certain of said control means comprising stop elements for controlling the movement of each one of the said carriage members according to the said spacing of the said elements and thus the movement of each of the said dies.

8. Glass moulding apparatus, comprising a double circular track provided with a supporting channel-like recess between the inner and outer portions of the said double-track, gearing means to provide a constant drive for said portions of said track, a plurality of carriage-like members shaped to slide-fit in said recess in spaced-apart relation in the said recess formed between the said tracks, die members respectively mounted on the said carriages for movement about said track therewith, a plurality of sets of normally stationary control means mounted adjacent said track in spaced-apart relation relative thereto, each of said carriage-like members provided with an upstanding projection portion near the leading edge thereof and an upstanding pin portion near the rear edge thereof, certain of said control means including manually controlled engaging elements affecting the movement of certain of said carriage-like members and manually operated means for lifting said carriage members and therewith the associated dies from the said track.

9. In a device of the class described, comprising means constituting a double circular track formed by a movable track member and a constantly driven track member arranged to provide a channel therebetween, gearing means for driving the said driven member, carriage-like members shaped to fit in said channel in spaced-apart relation, dies respectively secured to the said carriage-like members so as to move about said track therewith, manually selective control means adjacent to said track, said carriage-like members each being provided with an upstanding projection portion near its leading edge thereof and an upstanding pin portion near its rear edge thereof, said control means including carriage projection portion engaging elements for respectively blocking the movement of said carriages and thereby said dies without affecting the movement of the said track and stop means being manually actuated to release certain said other carriage members.

10. Glass moulding machine, comprising means providing a continuous double-track comprising a first track member and a second track member spaced apart, gearing means for moving the said track, carriage-like members shaped to slide-fit in the space formed between said track members and to be moved by the said track members when said track members are moved by the said gearing means, means constituting a plurality of control assemblies arranged in spaced relation adjacent the said track, dies respectively mounted on said carriage-like members so as to be individually transported about said track one after the other, said carriage-like members each being provided with an upstanding projection portion near its leading edge thereof and an upstanding pin portion near its rear edge thereof, said spaced apart control assemblies being arranged at a pin-assembly starting position, a pre-heating position, a pressure applying position, and an ejecting position, said assemblies including manually selective control elements for releasing said carriage members from the said starting station, stopping said carriage member under the said pre-heating station, and releasing the said carriage member so that the said associated die will be moved to the said pressure applying station, means for elevating the said carriage member relative to the said track at the said pressure station, and for returning the said carriage member to the said track so that the said carriage member will be moved to the said ejecting station, and further control means releasing the said carriage so that the said carriage member will be returned to the said starting position.

11. Glass moulding apparatus, comprising a circular double-track, gearing means to provide a continuous drive for said track, a plurality of carriage-like members shaped to fit in the space formed between the said double-track so as to be supported by and to move therewith, a plurality of dies respectively mounted on said carriage-like members for movement therewith, and a plurality of groups of control elements positioned in spaced-apart relation along the track and in relative operative relation to each other, said carriage-like members each being provided with an upstanding projection near its leading edge and an upstanding pin near its rear edge for engaging said control elements, certain of said control elements groups being movable relative to each other and to the said track and including manually actuated elements selectively movable into the path of the said upstanding projection for progressively arresting and releasing the said carriage-like members and therethrough said dies.

12. Glass moulding mechanism, comprising a circular double-track, gearing means to provide a continuous drive for said track, a plurality of carriage-like members shaped to fit in the space formed between the said track so as to be moved in spaced-apart relation by the said track when said track is moved by the said gearing means, cooperatively related means constituting starting, pre-heating, pressure applying, and ejection control stations mounted in a predetermined spaced-apart relation around the said track and in operative proximity relative thereto, a plurality of like dies respectively mounted on said carriage-like members for movement therewith, said control stations collectively including elements for selectively arresting a released carriage at the said stations, each of said carriage-like members being provided with an upstanding projection portion near the leading edge thereof and an upstanding pin portion near the rear edge thereof, said elements being manually movable out of the path of the said upstanding projection and pin for releasing a carriage member at the said pre-heating station, ramp means to move said die by its carriage member onto the said pressure applying station thereby to be elevated above the said circular track, means to move the said carriage member on to the said track after the said pressure applying action thereby to permit the said track to move the said carriage and its associated carriage member to the ejecting station, and means to eject the contents of the die of the carriage member so positioned and to permit the said track to move the said carriage member and thereby the said die to the said starting station for positioning the said die at the said starting station.

CHARLES FREDERIC MARCHANT HAYES.

REFERENCES CITED

The following references are of record in the file of this patent:

UNITED STATES PATENTS

| Number | Name | Date |
| --- | --- | --- |
| 140,927 | Kloman | July 15, 1873 |
| 829,530 | Kuhlewind | Aug. 28, 1906 |
| 1,156,446 | Taylor et al. | Oct. 12, 1915 |
| 1,326,765 | Miller | Dec. 30, 1919 |
| 1,699,538 | Keller et al. | Jan. 22, 1929 |
| 1,730,572 | Hansen | Oct. 8, 1929 |
| 1,900,455 | Maynard | Mar. 7, 1933 |
| 2,406,297 | Johnston | Aug. 20, 1946 |